US011443865B2

(12) United States Patent
Onderwater et al.

(10) Patent No.: US 11,443,865 B2
(45) Date of Patent: Sep. 13, 2022

(54) TARGET IRRADIATION SYSTEMS FOR THE PRODUCTION OF RADIOISOTOPES

(71) Applicant: BWXT Isotope Technology Group, Inc., Lynchburg, VA (US)

(72) Inventors: Thomas G. Onderwater, Peterborough (CA); Benjamin D. Fisher, Lynchburg, VA (US)

(73) Assignee: BWXT Isotope Technology Group, Inc., Lynchburg, VA (US)

(*) Notice: Subject to any disclaimer, the term of this patent is extended or adjusted under 35 U.S.C. 154(b) by 363 days.

(21) Appl. No.: 16/511,453

(22) Filed: Jul. 15, 2019

(65) Prior Publication Data

US 2020/0027618 A1    Jan. 23, 2020

Related U.S. Application Data

(60) Provisional application No. 62/698,540, filed on Jul. 16, 2018.

(51) Int. Cl.
*G21G 1/02* (2006.01)
*G21C 23/00* (2006.01)
(Continued)

(52) U.S. Cl.
CPC ............... *G21G 1/02* (2013.01); *G21C 23/00* (2013.01); *G21C 1/022* (2013.01); *G21C 1/20* (2013.01);
(Continued)

(58) Field of Classification Search
CPC .. G21G 1/02; G21G 2001/0094; G21G 1/001; G21C 23/00; G21C 1/022; G21C 1/20
(Continued)

(56) References Cited

U.S. PATENT DOCUMENTS 6,011,825 A     1/2000  Welch et al.
2008/0290302 A1  11/2008  James et al.
(Continued)

FOREIGN PATENT DOCUMENTS

WO     2014/107218 A2      7/2014
WO     WO-2016207054 A1 *  12/2016  ............... G21G 1/02

OTHER PUBLICATIONS

International Search Report and Written Opinion, PCT/US19/41807, dated Dec. 17, 2019, 9 pages.
(Continued)

*Primary Examiner* — Jack W Keith
*Assistant Examiner* — Daniel Wasil
(74) *Attorney, Agent, or Firm* — Nelson Mullins Riley & Scarborough LLP

(57) ABSTRACT

A target irradiation system including an irradiated target removal system having a body defining a central bore, an elevator received within the central bore, and a docking surface for placing the irradiated target removal system in fluid communication with a vessel penetration of a reactor. A target canister slidably receives the radioisotope target therein, and the elevator is configured to receive the target canister. The elevator is lowered into the reactor when irradiating the radioisotope target, and the irradiated target removal system forms a portion of a pressure boundary of the reactor during target irradiation.

14 Claims, 17 Drawing Sheets

(51) Int. Cl.
    *G21G 1/00*     (2006.01)
    *G21C 1/02*     (2006.01)
    *G21C 1/20*     (2006.01)
(52) U.S. Cl.
    CPC ..... *G21G 1/001* (2013.01); *G21G 2001/0094* (2013.01)
(58) Field of Classification Search
    USPC .......................................................... 376/202
    See application file for complete search history.

(56) References Cited

U.S. PATENT DOCUMENTS

| | | | |
|---|---|---|---|
| 2011/0006186 A1 | 1/2011 | Allen et al. | |
| 2011/0051874 A1* | 3/2011 | Allen ................. | G21G 1/02 376/202 |
| 2013/0177126 A1* | 7/2013 | Runkle ............... | G21G 1/02 376/342 |
| 2013/0223578 A1* | 8/2013 | Russell ............... | G21G 1/02 376/171 |
| 2013/0315361 A1* | 11/2013 | Berger ................ | G21G 1/02 376/202 |
| 2018/0025802 A1* | 1/2018 | Richter ............... | G21G 1/02 376/202 |

OTHER PUBLICATIONS

International Preliminary Report on Patentability, PCT/US2019/041807, dated Jan. 19, 2021, 8 pages.

\* cited by examiner

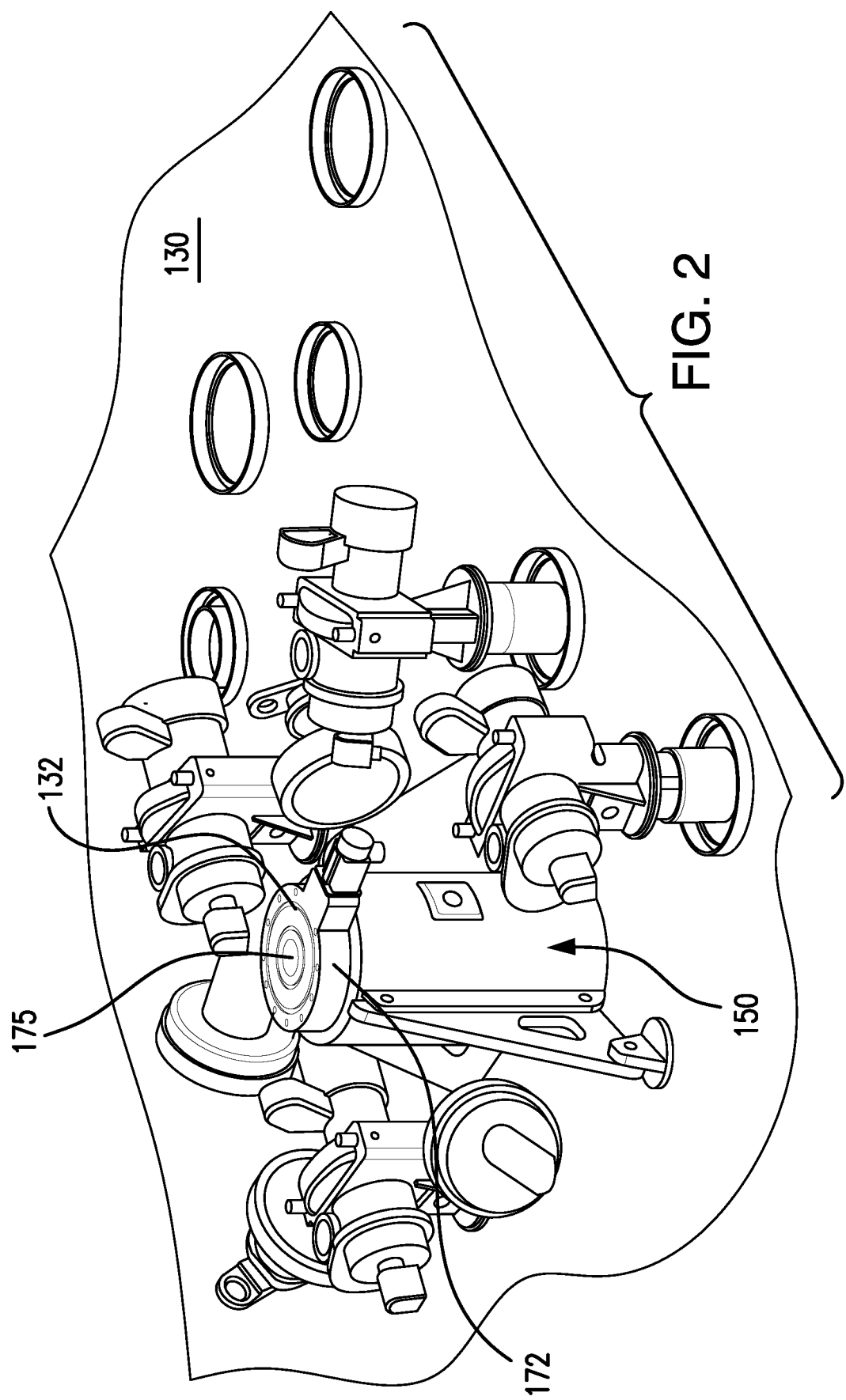

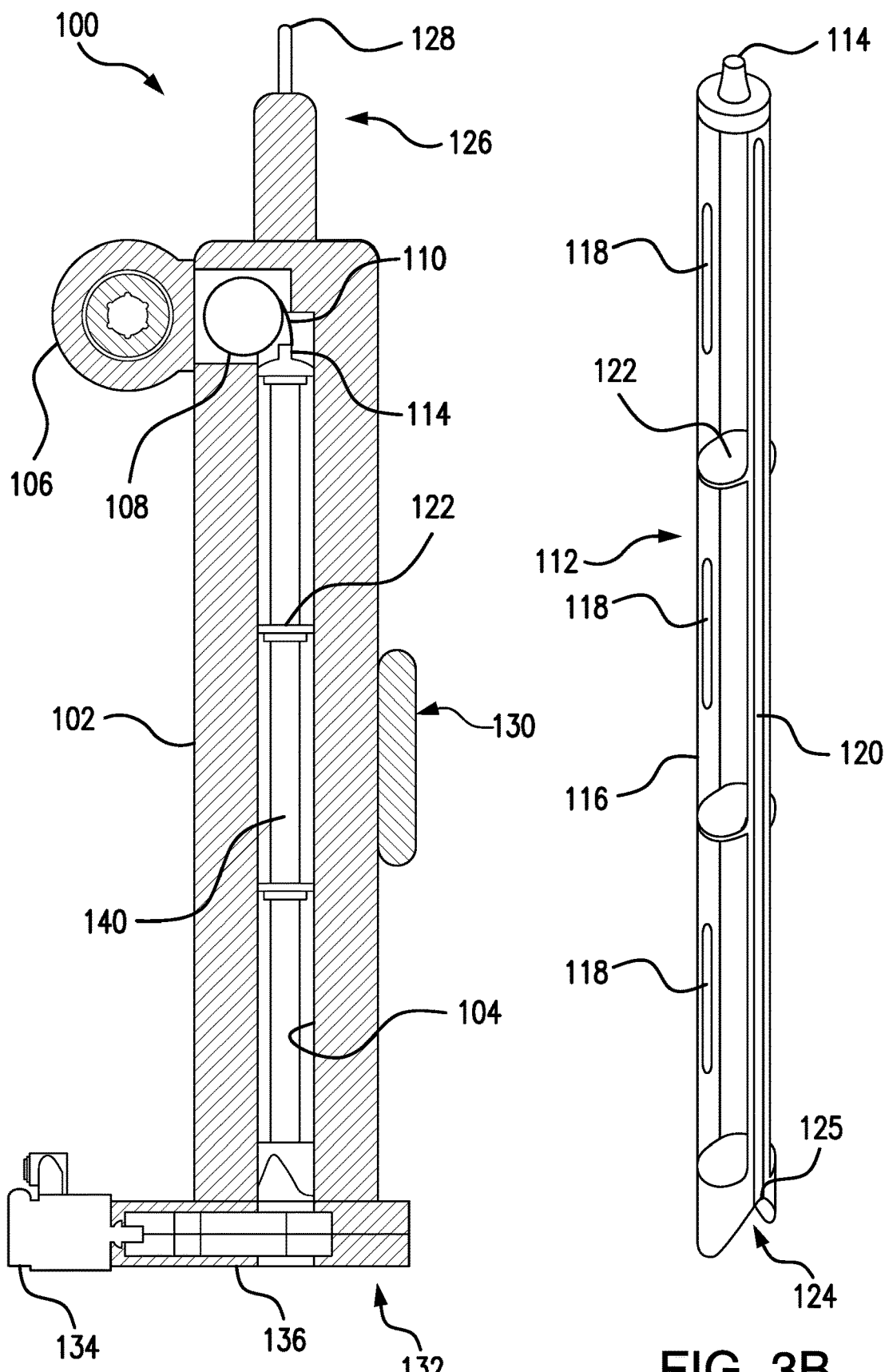

TARGET IRRADIATION SYSTEMS FOR THE PRODUCTION OF RADIOISOTOPES

CLAIM OF PRIORITY

This application claims priority to U.S. provisional patent application No. 62/698,540 filed Jul. 16, 2018, the disclosure of which is incorporated by reference herein.

TECHNICAL FIELD

The presently-disclosed invention relates generally to systems for irradiating radioisotope targets in nuclear reactors and, more specifically, to systems for irradiating radioisotope targets in heavy water-moderated fission-type nuclear reactors.

BACKGROUND

Technetium-99m (Tc-99m) is the most commonly used radioisotope in nuclear medicine (e.g., medical diagnostic imaging). Tc-99m (m is metastable) is typically injected into a patient and, when used with certain equipment, is used to image the patient's internal organs. However, Tc-99m has a half-life of only six (6) hours. As such, readily available sources of Tc-99m are of particular interest and/or need in at least the nuclear medicine field.

Given the short half-life of Tc-99m, Tc-99m is typically obtained at the location and/or time of need (e.g., at a pharmacy, hospital, etc.) via a Mo-99/Tc-99m generator. Mo-99/Tc-99m generators are devices used to extract the metastable isotope of technetium (i.e., Tc-99m) from a source of decaying molybdenum-99 (Mo-99) by passing saline through the Mo-99 material. Mo-99 is unstable and decays with a 66-hour half-life to Tc-99m. Mo-99 is typically produced in a high-flux nuclear reactor from the irradiation of highly-enriched uranium targets (93% Uranium-235) and shipped to Mo-99/Tc-99m generator manufacturing sites after subsequent processing steps to reduce the Mo-99 to a usable form, such as titanium-molybdate-99 (Ti—Mo99). Mo-99/Tc-99m generators are then distributed from these centralized locations to hospitals and pharmacies throughout the country. Since Mo-99 has a short half-life and the number of existing production sites are limited, it is desirable both to minimize the amount of time needed to reduce the irradiated Mo-99 material to a useable form and to increase the number of sites at which the irradiation process can occur.

There at least remains a need, therefore, for a system and a process for producing a titanium-molybdate-99 material suitable for use in Tc-99m generators in a timely manner.

SUMMARY OF INVENTION

One embodiment of the present disclosure provides a target irradiation system for irradiating a radioisotope target in a vessel penetration of a fission reactor, the system including an irradiated target removal system with a body defining a central bore, an elevator that is configured to be selectively received within the central bore, and a docking surface that is configured to selectively place the irradiated target removal system in fluid communication with the vessel penetration. A target canister includes a body defining a target bore that is configured to slidably receive the radioisotope target therein and a cap configured to attach to the body of the target canister, thereby providing a watertight seal for the target bore. The elevator is configured to receive the target canister therein and is lowered into the vessel penetration of the reactor when irradiating the radioisotope target. The irradiated target removal system forms a portion of a pressure boundary of the reactor when in fluid communication with the vessel penetration.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements.

FIG. 2 is a perspective view of the adjuster port docking pedestal shown in FIGS. 1A through 1C mounted to a reactivity mechanism deck of a nuclear fission reactor;

FIGS. 3A through 3D are partial, perspective views of an irradiated target removal system in accordance with an embodiment of the present invention;

Figure 1A:
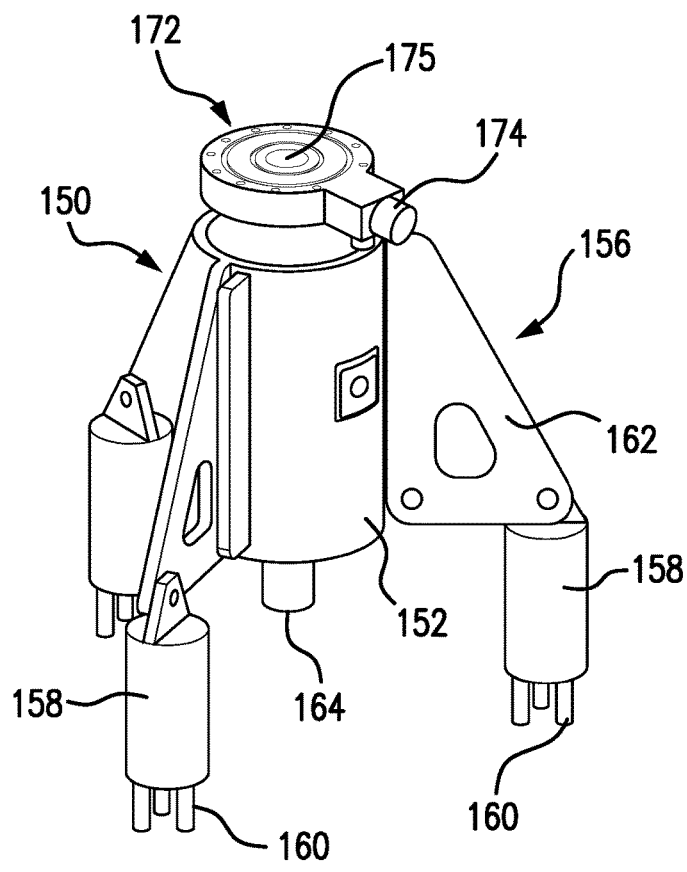
FIGS. 1A through 1C are partial, perspective views of an adjuster port docking pedestal in accordance with an embodiment of the present invention.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Referring now to the figures, a target irradiation system in accordance with the present disclosure includes an adjuster port docking pedestal 150 (FIGS. 1A through 1C) that is in fluid communication with a vessel penetration of a corresponding nuclear reactor, an irradiation target removal system 100 (FIG. 3A) that is selectively dockable with adjuster port docking pedestal 150 so that the irradiation target removal system 100 may insert into and extract irradiation targets 145 (FIG. 4) from the nuclear reactor, respectively, at least one target canister 140 (FIG. 4) for housing radioisotope targets 145 during irradiation, and an irradiated material transfer flask 180 (FIG. 8) including a target exchange module 190 (FIG. 8) disposed therein for the loading and unloading of target canisters 140. Referring additionally to FIG. 2, adjuster port docking pedestal 150 is preferably mounted to a reactivity mechanism deck 103 of a corresponding heavy water moderated nuclear fission reactor 101 (such as a CANDU (CANada Deuterium Uranium) reactor shown in FIGS. 10 and 12A through 12C), so that adjuster port docking pedestal 150 is in fluid communication with an unused adjuster port 105 (FIG. 12B) of the reactor. Note, however, in alternate embodiments various other types of reactors and vessel penetrations may be utilized during the radioisotope target irradiation process.

Figure 1B:
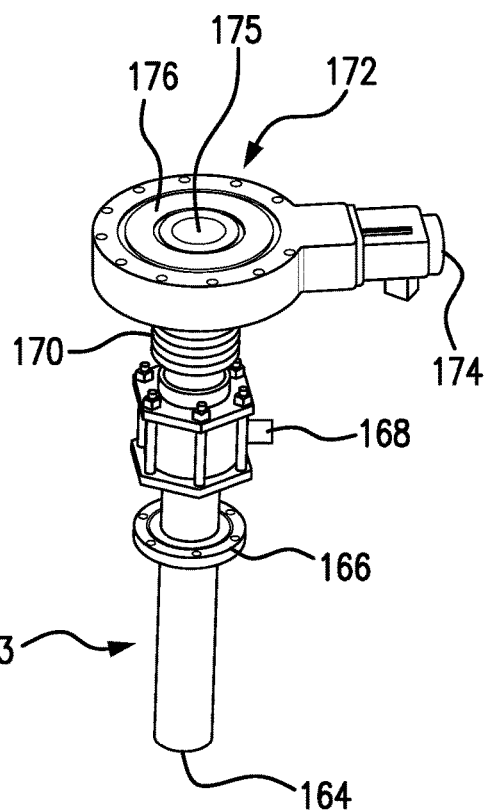
Figure 1C:
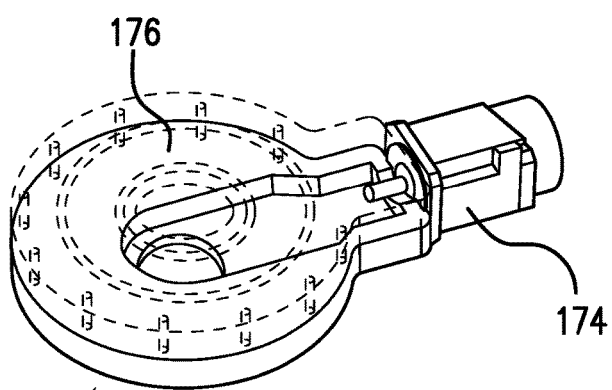

Referring now on the FIGS. 1A through 1C, adjuster port docking pedestal 150 includes an outer body portion 152 defining a central cavity in which an inner body portion 163 is disposed. Outer body 152 includes a plurality of support legs 156 extending radially-outwardly therefrom, each support leg 156 including an outrigger 162 with a socket 158 and corresponding lag bolts 160 disposed at its lower end. Each socket 158 is configured to be received in a corresponding mounting aperture of reactor reactivity mechanism deck 103 (FIG. 2), and lag bolts 160 are used to semi-permanently secure adjuster port docking pedestal 150 to the reactivity mechanism deck. Preferably, outer body 152 is formed of depleted uranium, thereby providing radiation shielding.

Inner body portion 163 of adjuster port docking pedestal 150 includes central bore 164 that is in fluid communication with the interior of reactor vessel 113 by way of the corresponding adjuster port, a mounting flange 166 that is configured to be secured to the corresponding adjuster port, and a gate valve 172 disposed at the upper end of inner body portion 163. Gate valve 172 includes a motor 174 for remote operation of a gate 175 (not shown in FIG. 1C) and provides a docking surface 176 so that an irradiated target removal system 100 (FIG. 3A) may be selectively secured to adjuster port docking pedestal 150, as discussed in greater detail below. Gate valve 172 provides a seal so that adjuster port docking pedestal 150 forms a portion of the reactor's pressure boundary when the gate valve is closed. A maintenance control valve 168 is also provided for pressure boundary isolation should maintenance be required on gate valve 172. Additionally, a force isolation bellows 170 is provided to lessen contact forces between irradiated target removal system 100 and adjuster port docking pedestal 150 during docking procedures, as discussed in greater detail below.

Figure 3C:
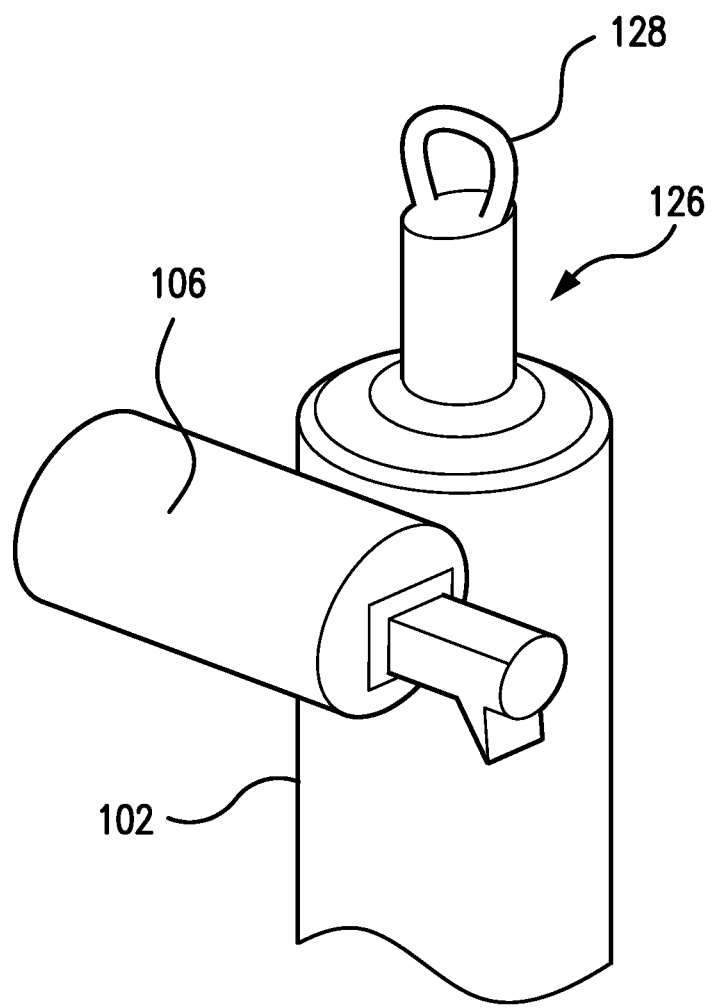
Figure 3D:
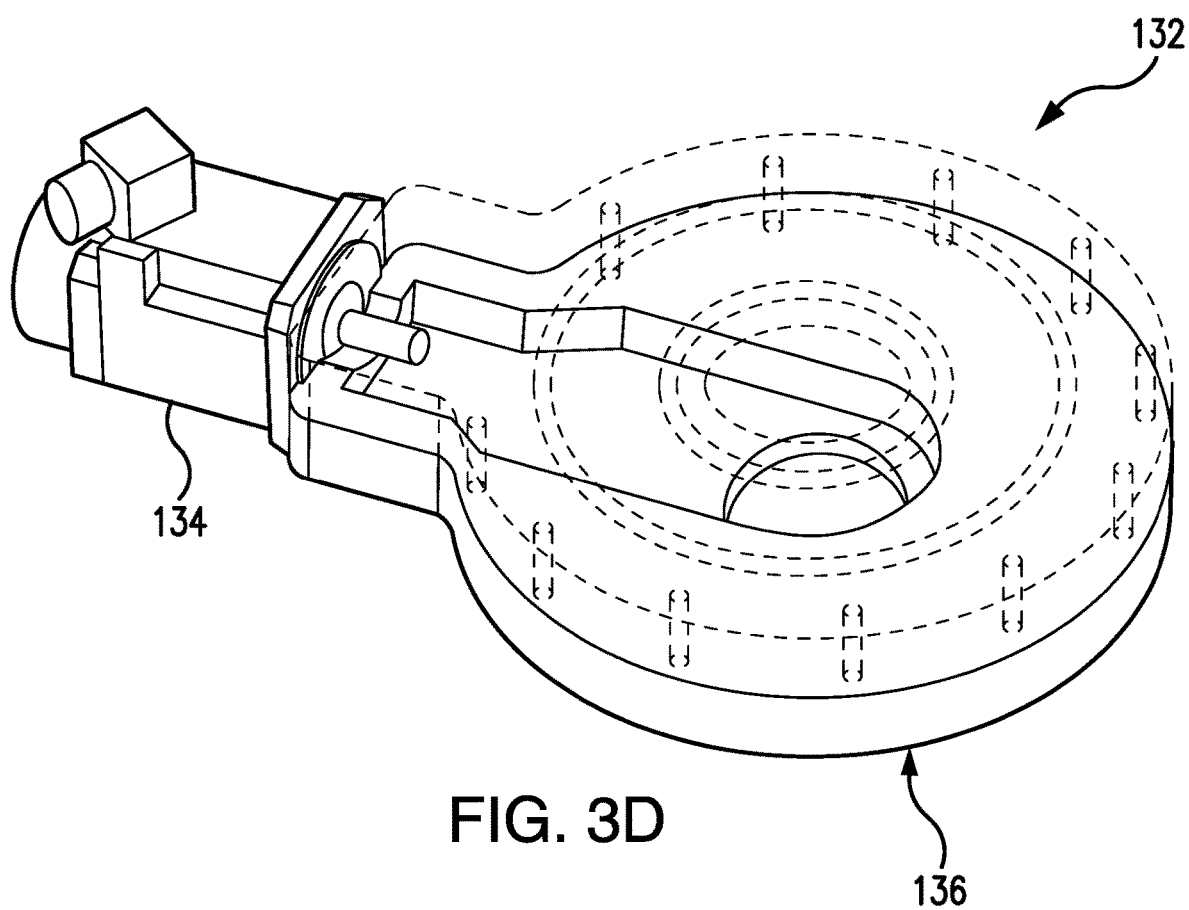

Referring now to FIGS. 3A through 3D, irradiated target removal system 100 includes a body 102 defining an elongated central bore 104, an elevator 112 that is selectively receivable within central bore 104, a winch 106 that is connected to elevator 112 by cable 110 that passes over a pulley 108, and a gate valve 132 that is disposed on the bottom of irradiated target removal system 100. As best seen in FIG. 3B, elevator 112 includes a pair of opposed risers 116 that have a plurality of support platforms 122 extending therebetween. Each support platform is configured to slideably receive a corresponding target canister 140 thereon, as shown in FIG. 3A. Elongated protrusions 118 are disposed on the inner surfaces of both risers 116 and are configured to engage correspondingly shaped elongated grooves 147 on each target canister 140 (FIG. 4) to help maintain the target canisters in the desired positions on elevator 112. A connection point 114 is disposed at the top end of elevator 112 and is configured to be crimped to the bottom end of cable 110. Elevator 112 includes a V-shaped bottom surface 124 to facilitate proper alignment of elevator 112 within target exchange module 190 (FIG. 9) for the loading and unloading of target canisters 140, as discussed in greater detail below. The apexes of V-shaped bottom surface 124 each correspond to an elongated groove 120 formed on an outer surface of each riser 116, as also discussed in greater detail below.

Figure 6:
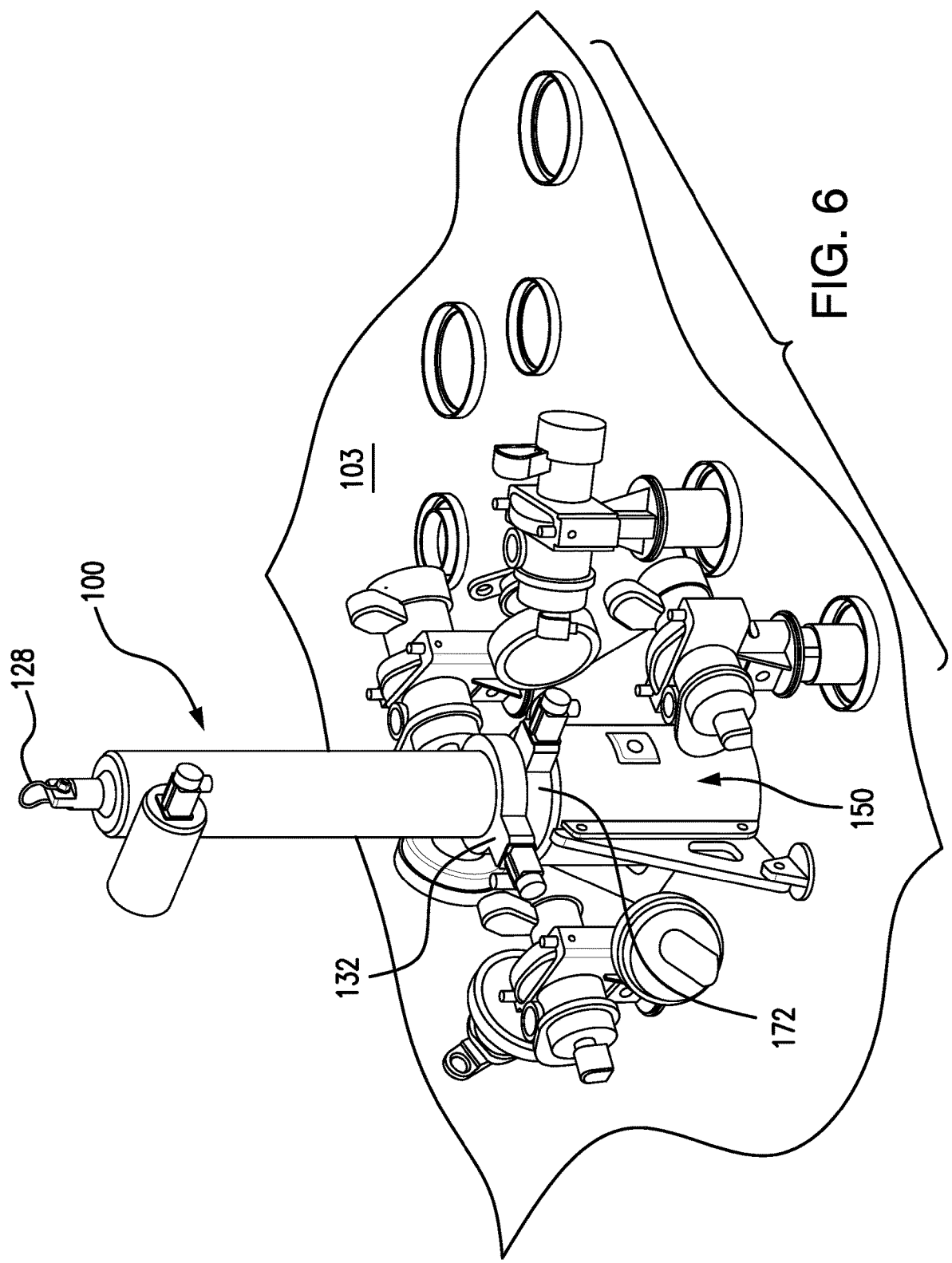
FIG. 6 is a perspective view of the irradiated target removal system, as shown in FIGS. 3A through 3D, mounted on an adjuster port docking pedestal, as shown in FIGS. 1A through 1C.

Irradiated target removal system 100 also includes a damped lift assembly 126 disposed on its upper end. Damped lift assembly 126 includes a shackle 128 to facilitate lifting by the reactor's crane 107 (FIG. 10), and is configured to lessen contact forces between irradiated target removal system 100 and adjuster port docking pedestal 150 during docking procedures. Preferably, a purging/drying tank 130 is provided for removing moderator water from the interior of irradiated target removal system 100 after the irradiation process is complete. The drying process is performed prior to shutting gate valve 132 and subsequently undocking irradiated target removal system 100 from adjuster port docking pedestal 150. Similarly to the gate valve of adjuster port docking pedestal 150, gate valve 132 includes a motor 134 for remote operation of a gate (not shown in FIG. 1C), and its bottom surface is a docking surface 136 for mating with docking surface 176 of adjuster port docking pedestal 150, as shown in FIG. 6.

Figure 4:
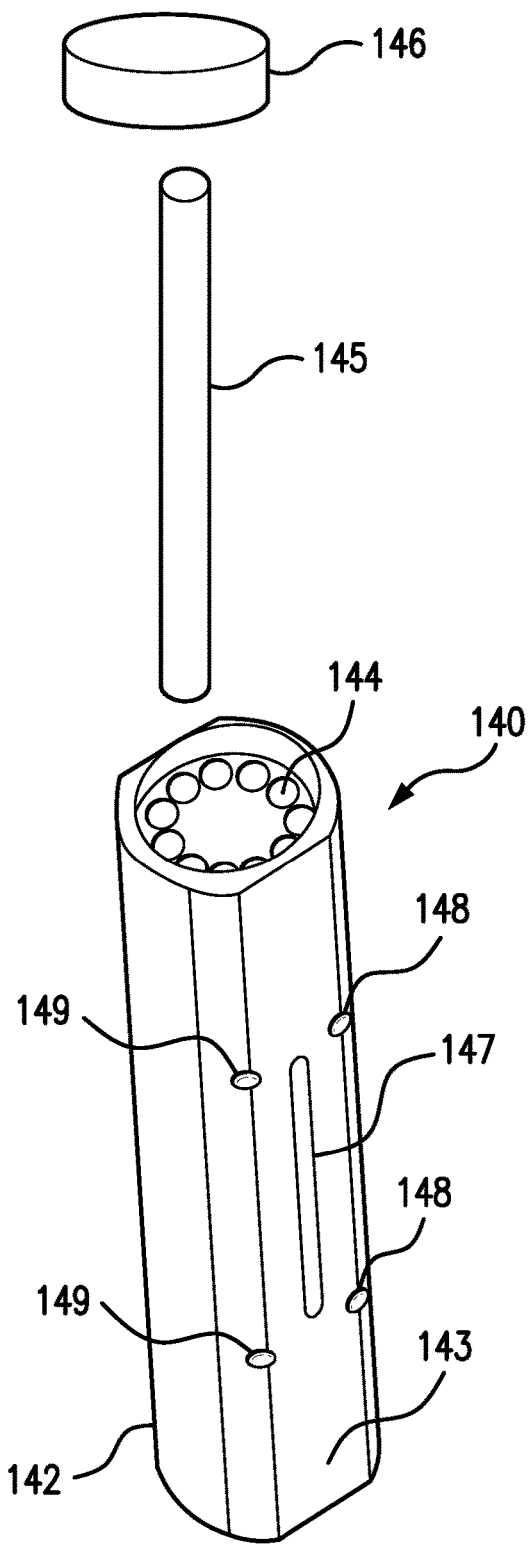
FIG. 4 is an exploded, perspective view of a target canister in accordance with an embodiment of the present invention.
Figure 5:
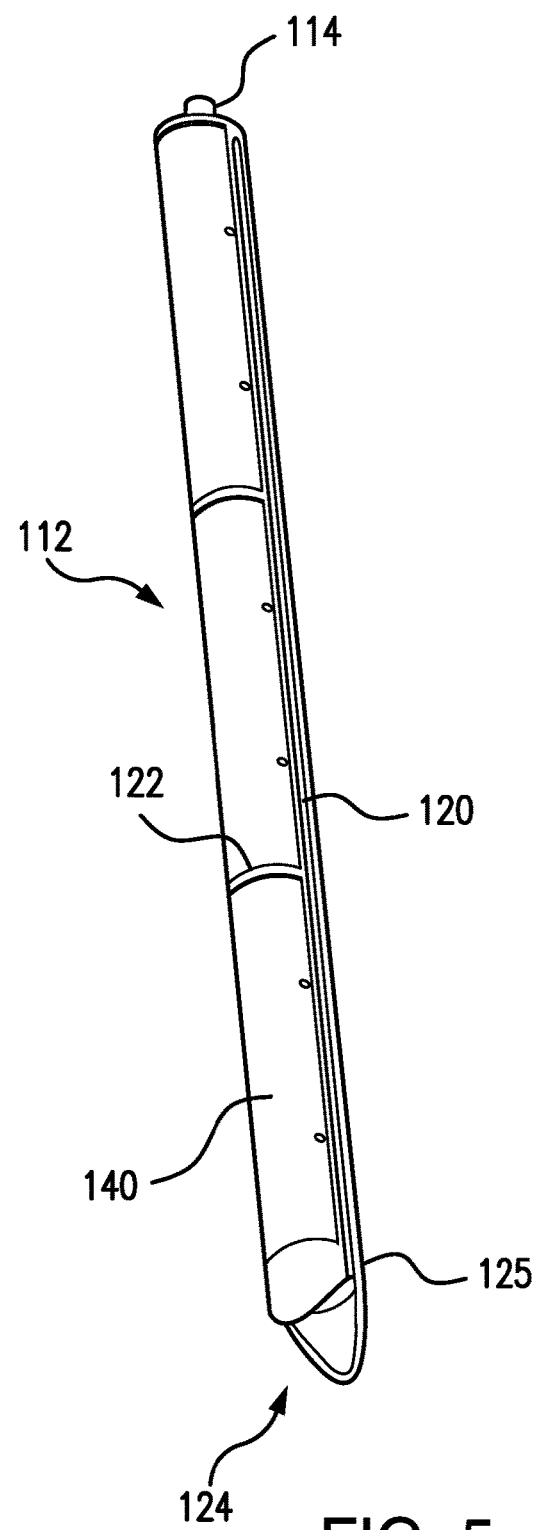
FIG. 5 is a perspective view of an elevator of the irradiated target removal system with target canisters mounted thereon.

Referring now to FIG. 4, target canister 140 includes a substantially cylindrical body portion 142 including a pair of opposed, parallel sidewalls 143. A plurality of target bores 144 is defined by target canister 140, each target bore 144 being parallel to a longitudinal center axis of target canister 140, and configured to slideably receive a corresponding radioisotope target 145 therein. A sealing cap 146 is connectable to the end of target canister 140 from which target bores 144 extend so that the interior of target canister 140 remains free of fluids during the irradiation process. A first pair of recesses 148 and a second pair of recesses 149 are formed on opposite sides of each sidewall 143 and are configured to be selectively engaged by corresponding gripper pins of target exchange module 190 (FIG. 9) during loading and unloading operations, as discussed in greater detail below. As well, each sidewall 143 includes an elongated groove 147 that is configured to selectively receive a corresponding elongated protrusion 118 formed on the inner surface of the elevator's risers 116 (FIG. 3B) to help retain each target canister 140 on elevator 112, as shown in FIG. 5.

Figure 7B:
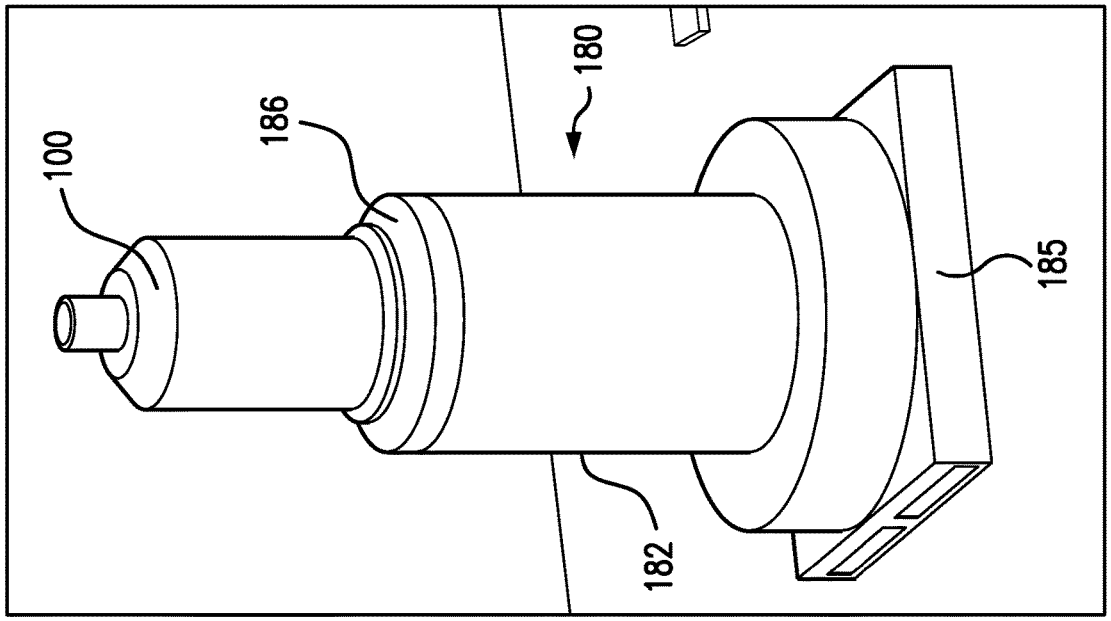
FIGS. 7A and 7B are perspective views of an irradiated material transfer flask in accordance with an embodiment of the present invention.
Figure 7A:
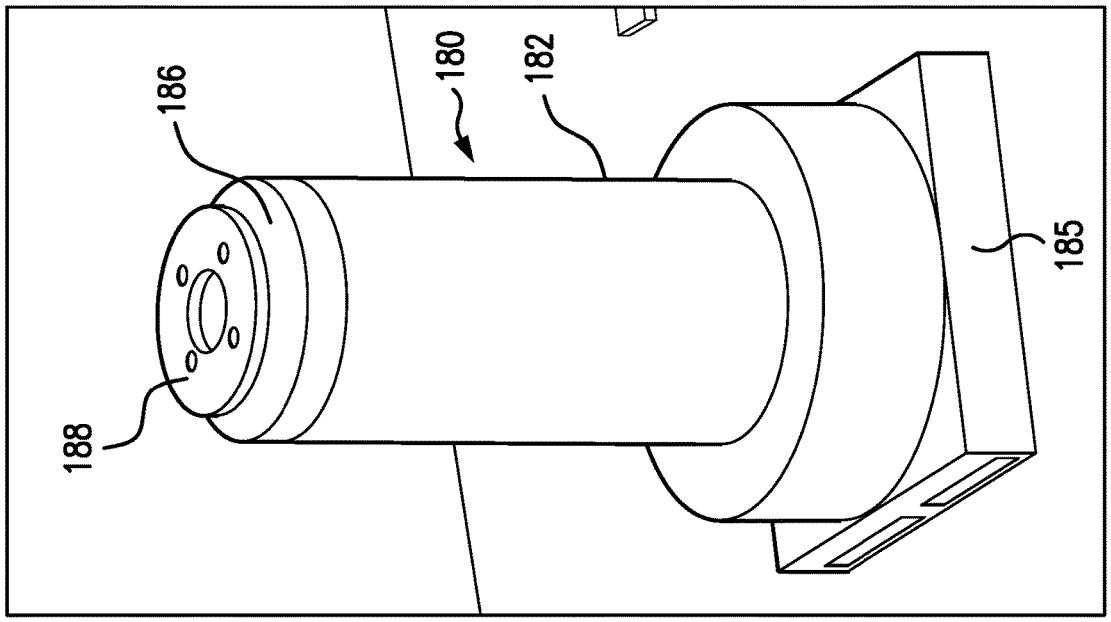
Figure 8:
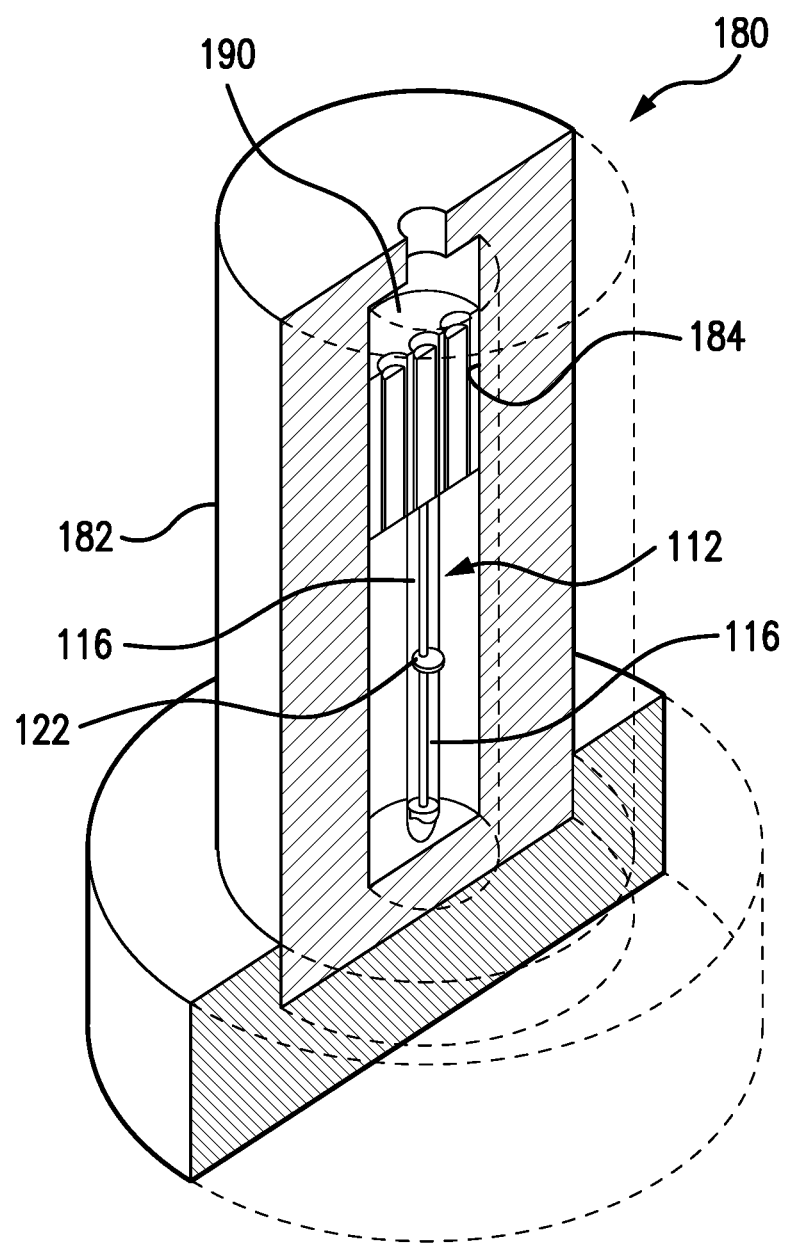
FIG. 8 is a cross-sectional view of the irradiated material transfer flask shown in FIGS. 7A and 7B.
Figure 11:
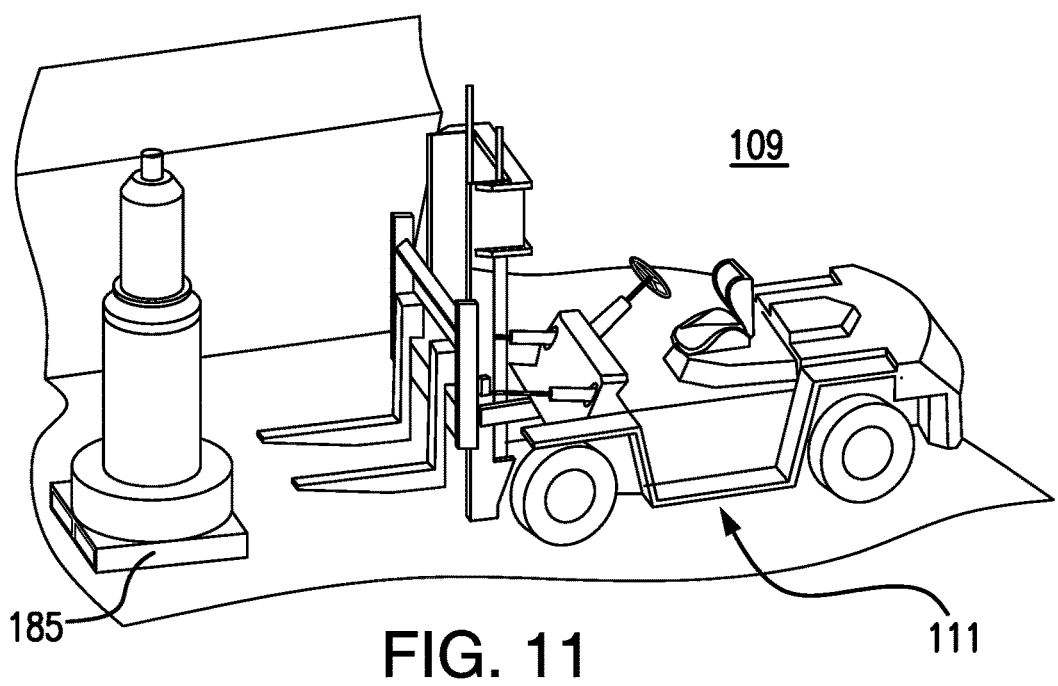
FIG. 11 is a perspective view of an irradiated target removal system mounted to an irradiated material transfer flask in a loading/unloading area.

Referring now to FIGS. 7A, 7B and 8, irradiated material transfer flask 180 includes a body 182 defining a central bore 184, a target exchange module 190 disposed within central bore 184, and an in-station transfer tool 186 mounted to a top end of body 182. During loading and unloading operations, irradiated target removal system 100 is docked with in-station transfer tool 186, as shown in FIG. 7B. In-station transfer tool 186 provides the required pneumatic/electrical connections to facilitate the loading and unloading of target canisters 140, and its upper surface forms a docking surface 188 that is configured to mate with docking surface 136 of irradiated target removal system 100. Once irradiated target removal system 100 is securely docked with irradiated material transfer flask 180, gate valve 132 of irradiated target removal system 100 is opened and elevator 112 is lowered into central bore 184 so that target canisters 140 may be loaded and/or unloaded by target exchange module 190. Note, as shown in FIGS. 7A and 7B, irradiated material transfer flask 180 is disposed atop a cradle 185 that facilitates movement of irradiated material transfer flask 180 by a forklift 111 (FIGS. 10 and 11) in a loading area 109 of the reactor facility.

Figure 9:
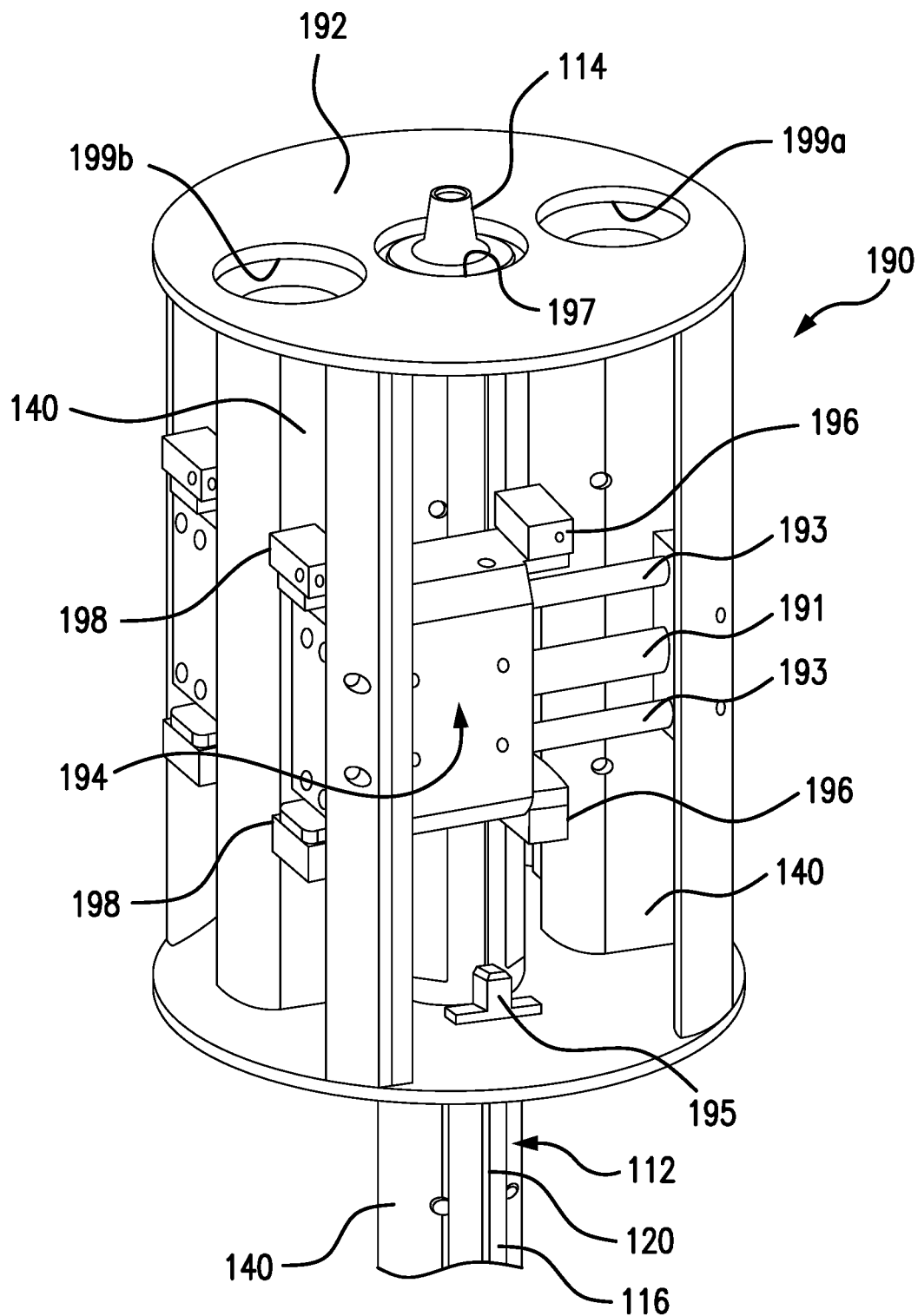
FIG. 9 is a perspective view of a target exchange module in accordance with an embodiment of the present invention.
Figure 10:
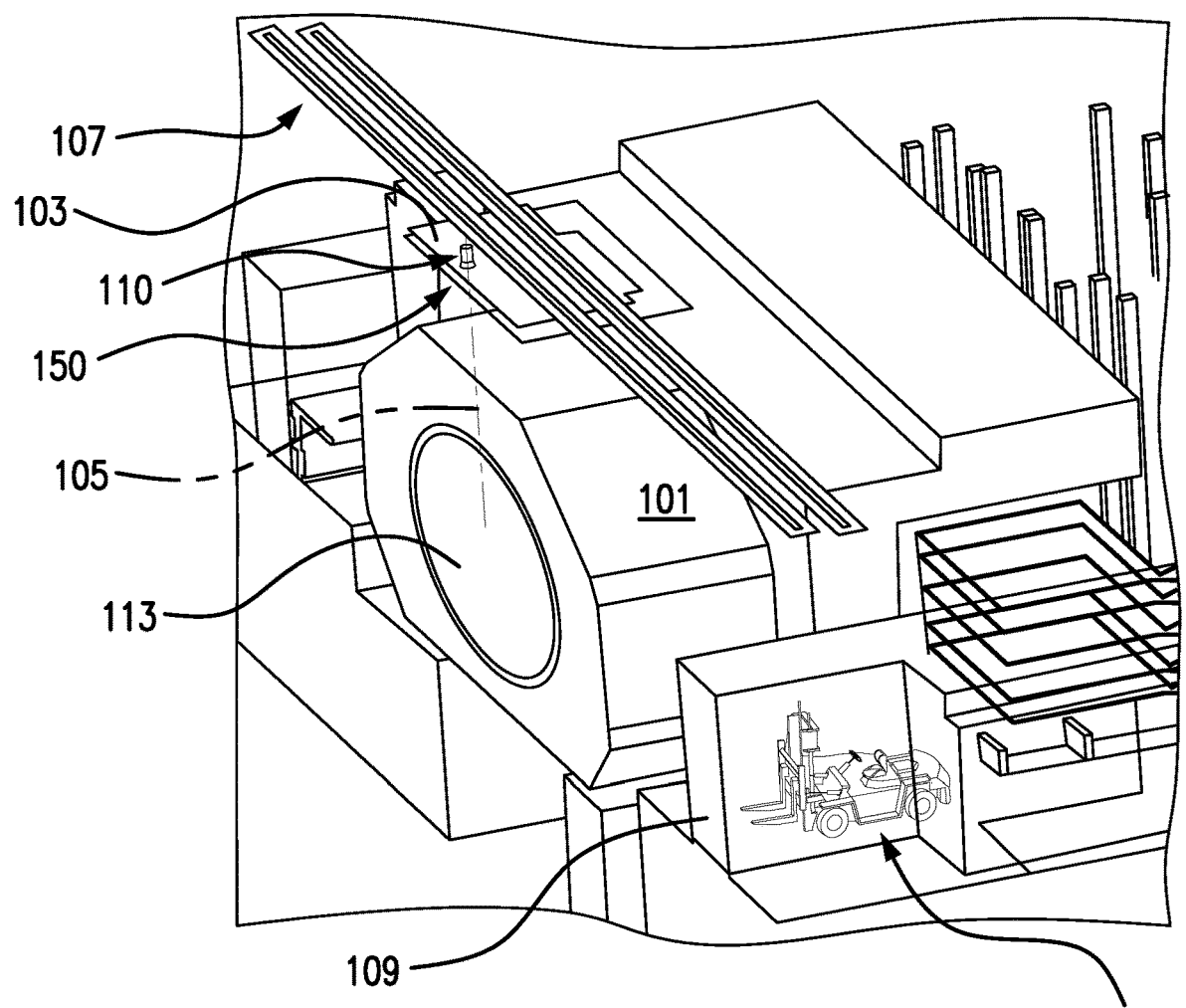
FIG. 10 is a perspective view of a heavy water moderated fission reactor including a target irradiation system in accordance with an embodiment of the present invention.

Referring now to FIG. 9, target exchange module 190 includes a frame 192 defining a central passage 197 and first and second storage locations 199a and 199b, respectively, disposed on opposite sides of central passage 197. Central passage 197 is configured to allow elevator 112 of irradiated target removal system 100 to pass through target exchange module 190 so that the desired target canister 140 of the elevator may be aligned with a pair of gripper slides 194 of target exchange module 190.

As shown in FIG. 9, each gripper slide 194 includes a first pair of gripper pins 196 and a second pair of gripper pins 198, wherein each pair of gripper pins is configured to selectively engage a corresponding pair of recesses 148 and 149 of target canister. Interaction between the gripper pins and the gripper recesses allows gripper slides 194 to move target canisters 140 both onto and off of elevator 112. Moreover, gripper pins 196 and 198 may remain engaged with the corresponding recesses 148 and 149 of the target canisters during movement of irradiated material transfer flask 180 to help stabilize them. Each gripper slide 194 includes a piston 191 for moving the slide transversely along a pair of linear bearings 193.

Referring still to FIG. 9, target exchange module 190 includes a pair of rotary guide pins 195, the rotary guide pins being disposed opposite each other and adjacent central passage 197. Each rotary guide pin 195 extends radially inwardly into central passage 197 and is configured to engage the outer periphery of V-shaped bottom surface 124 of elevator 112 as the elevator is lowered into central passage 197 of target exchange module 190. As elevator 112 is lowered into central passage 197, each rotary guide pin 195 comes into contact with a corresponding portion of V-shaped bottom surface 124. If rotary guide pins 195 are aligned with apexes 125 of V-shaped bottom surface 124, each rotary guide pin 195 will slideably enter a corresponding one of the elongated grooves 120, each of which originates at a corresponding apex 125 of the bottom surface and elevator 112. As such, the elevator will pass through target exchange module 190 without rotation. However, if rotary guide pins 195 make contact with V-shaped bottom surface 124 anywhere other than apexes 125, elevator 112 will be caused to rotate as the periphery of the bottom surface passes along rotary guide pins 195. When rotary guide pins 195 reach apexes 125, rotation will stop and rotary guide pins 195 will slideably pass through the corresponding elongated grooves until elevator 112 reaches the desired position.

Figure 12A:
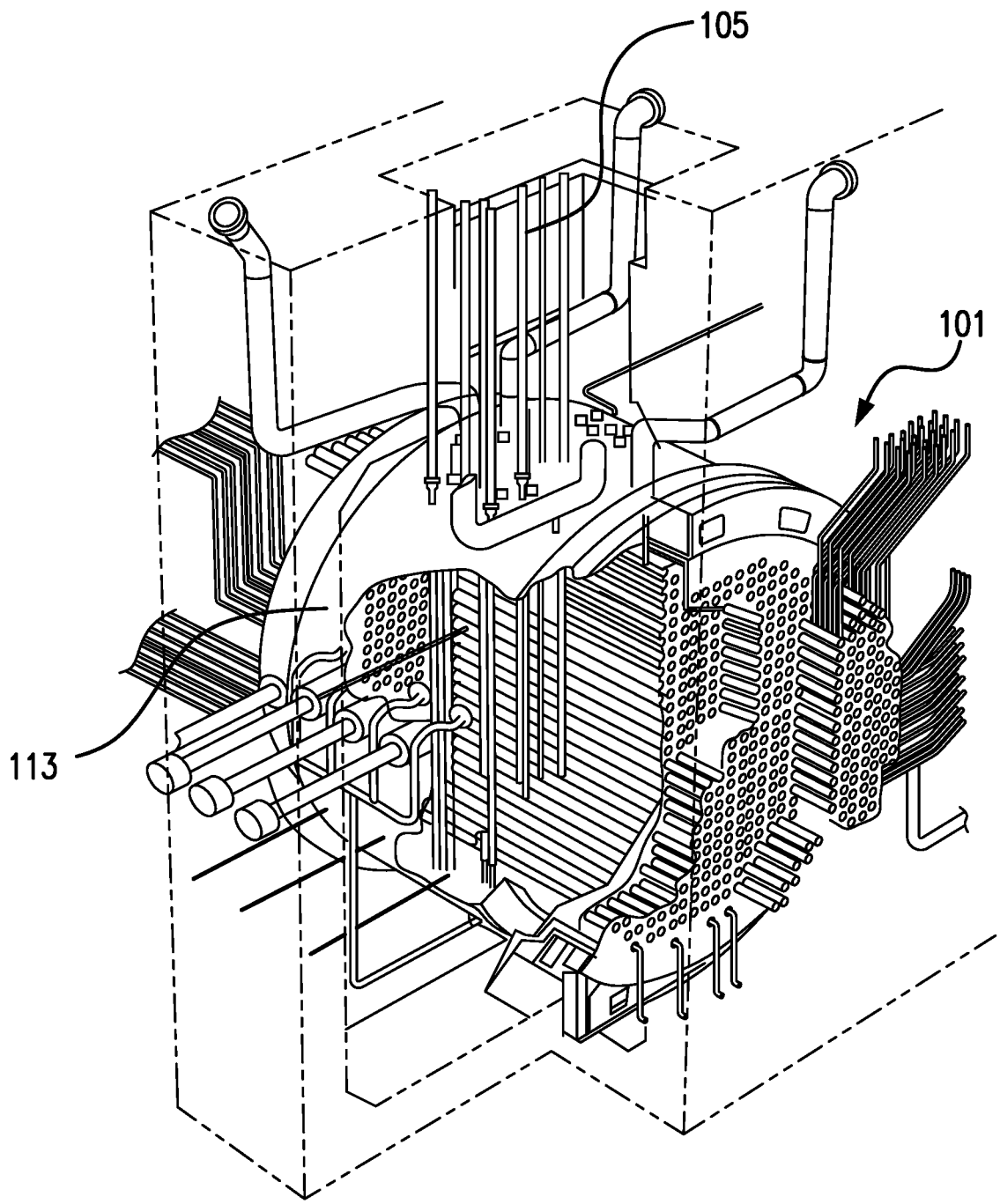
FIGS. 12A through 12C are various views of a heavy water moderated fission reactor and corresponding vessel penetrations.
Figure 12B:
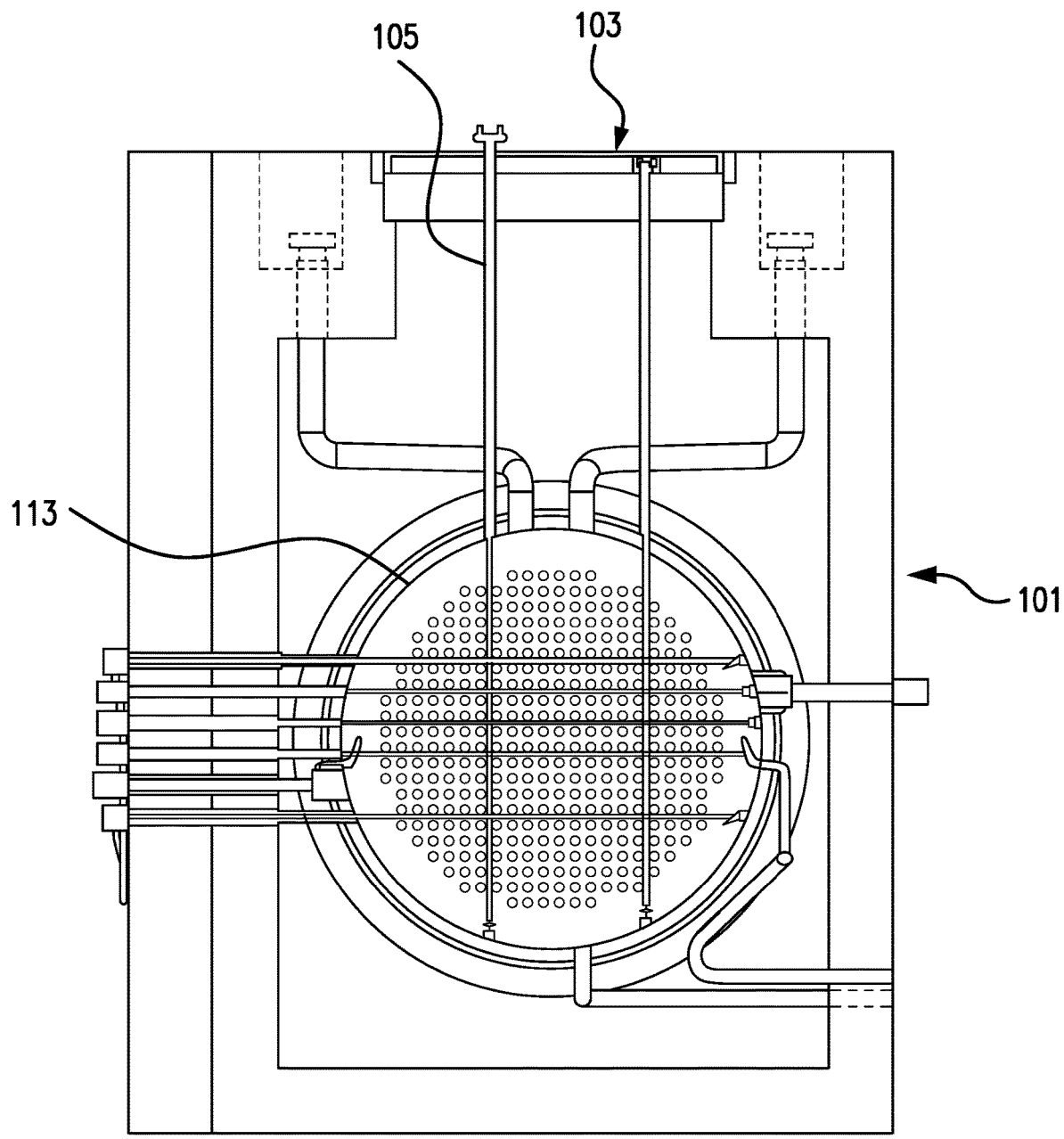
Figure 12C:
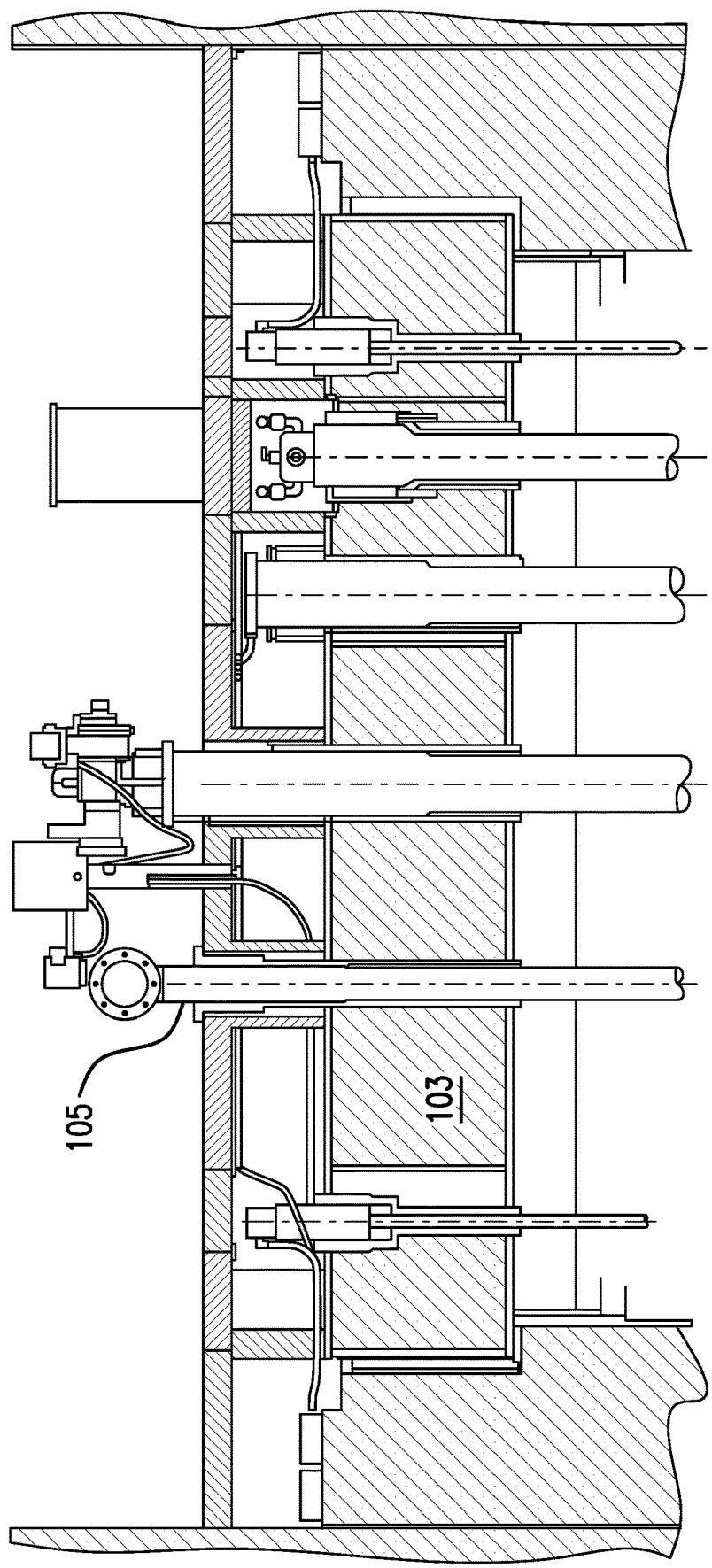
Figure 13A:
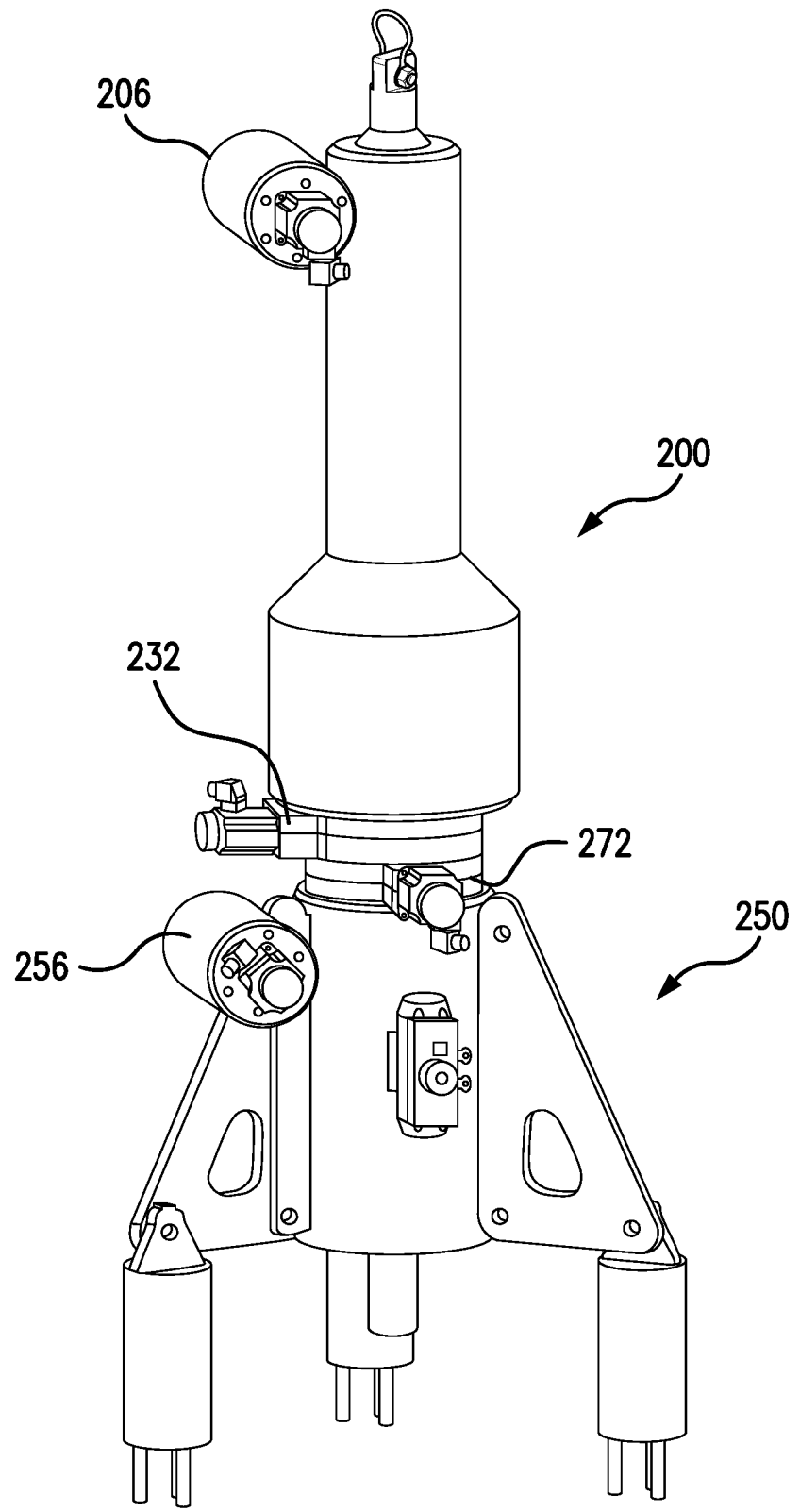
FIGS. 13A and 13B are perspective and cross-sectional views, respectively, of an alternate embodiment of a target irradiation system in accordance with the present invention.
Figure 13B:
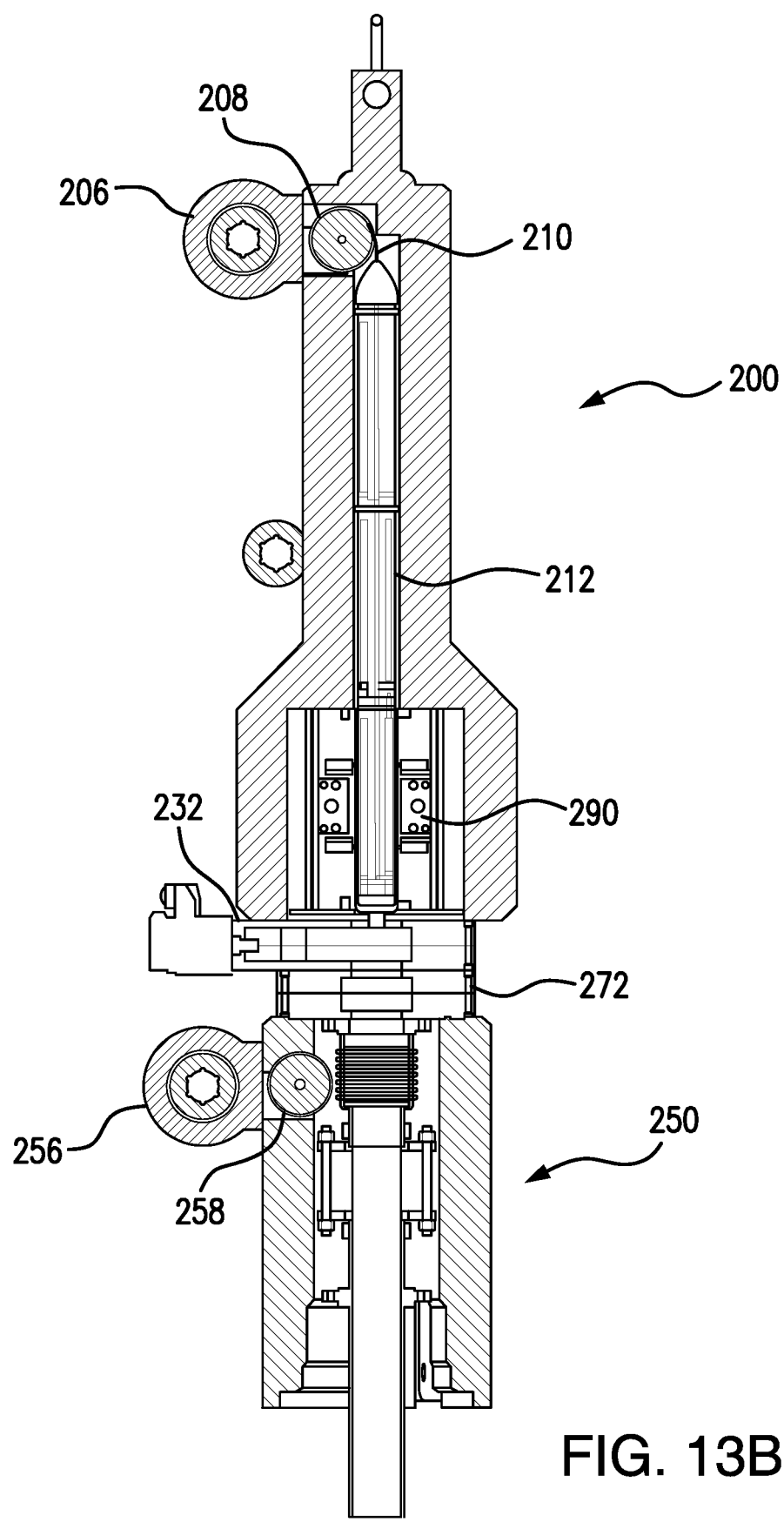

Referring now to FIGS. 13A and 13B, an alternate embodiment of a target irradiation system in accordance with the present disclosure is shown. The alternate embodiment differs primarily from the previously discussed embodiment in that adjuster port docking pedestal 250 includes a winch 256 and pulley 258 for raising and lowering an elevator. Similarly to the previous discussed embodiment, after irradiated target removal system 200 is docked to adjuster port docking pedestal 250, gate valves 232 and 272 are opened and elevator 212 may be lowered into the adjuster port docking pedestal 250, which is in fluid communication with corresponding adjuster port 105 (FIGS. 12B and 12C). However, unlike the previous embodiment, once in the adjuster port docking pedestal 250, elevator 212 is transferred to winch 256 and pulley 258 for further lowering into the adjuster port. After elevator 212 is transferred to winch 256, gate valves 232 and 272 are closed so that irradiated target removal system 200 no longer forms a portion of the pressure boundary of the reactor. As such, irradiated target removal system 200 can be un-docked from adjuster port docking pedestal 250 and removed for the duration of the irradiation process. Note, the target irradiation system shown in FIGS. 13A and 13B also differs from the previous embodiment in that irradiated target removal system 200 includes an onboard target exchange module 290 for the loading and unloading target canisters 140.

Figure 14:
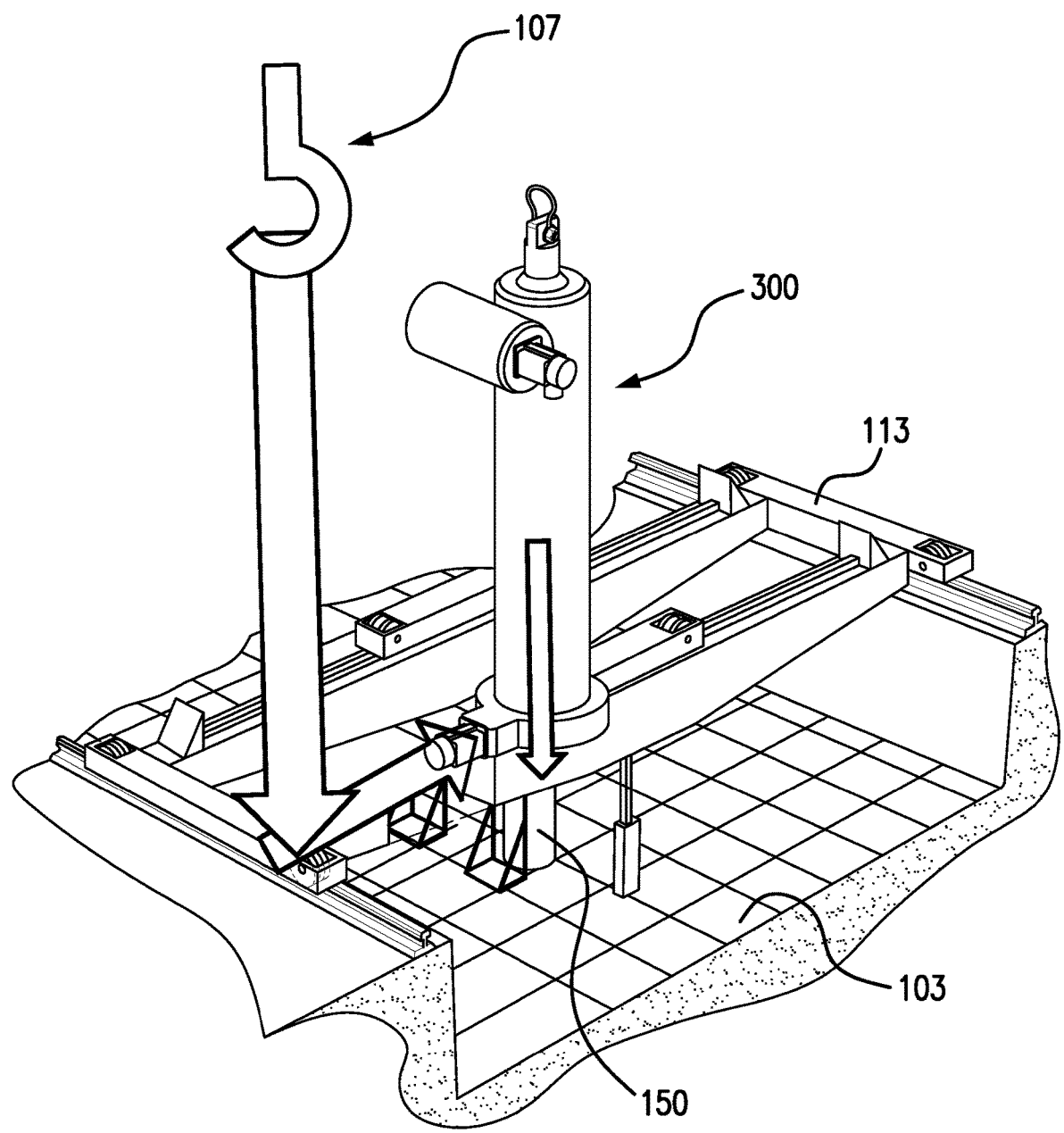
FIG. 14 is a perspective view of view of yet another alternate embodiment of a target irradiation system in accordance with the present invention.

As shown in FIG. 14, yet another embodiment of a target irradiation system includes an irradiated target removal system 300 that is supported by a bridge 113 when positioned over the adjuster port docking pedestal 150 and reactivity mechanism deck 103 as targets are irradiated. The support provided by bridge 113 lessens the weight supported by the adjuster port docking pedestal and also limits the number of moves required by crane 107 over the reactivity mechanism deck to properly position irradiation target removal system 300.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed:

1. A target irradiation system for irradiating a radioisotope target in a fission reactor through a vessel penetration thereof, comprising:
  an irradiated target removal system including a body defining a central bore, an elevator that is configured to be selectively received within the central bore, the elevator further comprising at least one support platform and a pair of opposed risers extending upwardly therefrom, and a docking surface that is configured to selectively place the irradiated target removal system in fluid communication with the vessel penetration; and a target canister including a body defining a target bore, and a cap configured to attach to the body of the target canister, thereby providing a water-tight seal for the target bore, wherein the target canister is slidably received between the pair of support risers and is disposed on the platform, wherein the elevator is movable from a first upper position in which the elevator is disposed within the central bore of the body of the irradiated target removal system to a second lower position in which the elevator is disposed below the body of the irradiated target removal system.

2. The target irradiation system of claim 1, wherein the irradiated target removal system further comprises a winch and pulley assembly connected to the elevator by a cable.

3. The target irradiation system of claim 1, wherein the irradiated target removal system further comprises a gate valve disposed at a bottom end of the body, and a bottom surface of the gate valve defines the docking surface of the irradiated target removal system.

4. The target irradiation system of claim 1, wherein the at least one support platform further comprises a first support platform and a second support platform and the pair of opposed risers connects the first and the second support platforms.

5. The target irradiation system of claim 1, further comprising an adjuster port docking pedestal including a body defining a central bore that is in fluid communication with the vessel penetration and a docking surface that is configured to be selectively secured to the docking surface of the irradiated target removal system is in fluid communication with the vessel penetration.

6. The target irradiation system of claim 5, wherein the adjuster port docking pedestal further comprises a gate valve disposed at a top end of the body of the adjuster port docking pedestal, and a top end of the gate valve defines the docking surface of the adjuster port docking pedestal.

7. The target irradiation system of claim 6, wherein the adjuster port docking pedestal further comprises a mounting flange that is affixed to the adjuster port.

8. A target irradiation system for irradiating a radioisotope target in a fission reactor having a vessel penetration, comprising:

an irradiated target removal system including a body defining a central bore, an elevator that is configured to be selectively received within the central bore, wherein the elevator is configured to move the radioisotope target into and out of an interior volume of the fission reactor, wherein the interior volume is subject to reactor operation pressure, and a gate valve that is movable between a first position in which the central bore is in fluid communication with the interior volume of the fission reactor and a second position in which the central bore is isolated from the interior volume of the fission reactor;

wherein the elevator is movable through the gate valve in the first position from a first upper position in which the elevator is disposed within the central bore of the irradiated target removal system and is outside of the interior volume of the fission reactor to a second lower position in which the elevator is disposed within the interior volume of the fission reactor and is subject to the reactor operation pressure.

9. The target irradiation system of claim 8, further comprising an adjuster port docking pedestal including a body defining a central bore, a docking surface, wherein the docking surface of the adjuster port docking pedestal is configured to be selectively secured to a docking surface of the gate valve of the irradiated target removal system.

10. The target irradiation system of claim 9, wherein the adjuster port docking pedestal further comprises a gate valve disposed at a top end of the body of the adjuster port docking pedestal, and a top end of the gate valve defines the docking surface of the adjuster port docking pedestal.

11. The target irradiation system of claim 10, further comprising:

a target canister including a body defining a target bore, and a cap configured to attach to the body of the target canister, thereby providing a water-tight seal for the target bore.

12. The target irradiation system of claim 11, wherein the elevator further comprises at least one support platform and a pair of opposed risers extending upwardly therefrom, wherein the target canister is slidably received between the pair of opposed risers and is disposed on the support platform.

13. The target irradiation system of claim 12, wherein the at least one support platform further comprises a first support platform and a second support platform and the pair of opposed risers connects the first and the second support platforms.

14. The target irradiation system of claim 12, wherein the irradiated target removal system further comprises a winch and pulley assembly connected to the elevator by a cable.

* * * * *